United States Patent
Lee et al.

(10) Patent No.: US 10,510,342 B2
(45) Date of Patent: Dec. 17, 2019

(54) VOICE RECOGNITION SERVER AND CONTROL METHOD THEREOF

(71) Applicant: SAMSUNG ELECTRONICS CO., LTD., Suwon-si, Gyeonggi-do (KR)

(72) Inventors: Kyung-min Lee, Suwon-si (KR);
Il-hwan Kim, Suwon-si (KR);
Chi-youn Park, Suwon-si (KR);
Young-ho Han, Yongin-si (KR);
Nam-hoon Kim, Seongnam-si (KR);
Jae-won Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/063,872

(22) Filed: Mar. 8, 2016

(65) Prior Publication Data

US 2017/0076716 A1    Mar. 16, 2017

(51) Int. Cl.
*G10L 15/00* (2013.01)
*G10L 15/06* (2013.01)
(Continued)

(52) U.S. Cl.
CPC .......... *G10L 15/19* (2013.01); *G10L 15/1822* (2013.01); *G10L 2015/223* (2013.01)

(58) Field of Classification Search
CPC .... G06F 17/2881; G06F 17/18; G06F 17/271; G06F 17/2785; G06F 17/30684;
(Continued)

(56) References Cited

U.S. PATENT DOCUMENTS 6,076,056 A    6/2000   Huang et al.
7,152,029 B2 *  12/2006  Alshawi ............... G10L 15/063
                                                            704/1
(Continued)

FOREIGN PATENT DOCUMENTS

JP    2001-517816    10/2001
JP    2002-117027    4/2002
(Continued)

OTHER PUBLICATIONS

Guthrie, D., Allison, B., Liu, W., Guthrie, L., & Wilks, Y. (2006). A closer look at skip-gram modelling. In: Proceedings of the fifth international conference on language resources and evaluation (LREC-2006) (pp. 1222-1225). 2006.*

(Continued)

*Primary Examiner* — Michael Ortiz-Sanchez
(74) *Attorney, Agent, or Firm* — Nixon & Vanderhye P.C.

(57) ABSTRACT

Provided herein is a voice recognition server and a control method thereof, the method including determining an index value for each of a plurality of training texts; setting a group for each of the plurality of training texts based on the index values of the plurality of training texts, and matching a function corresponding to each group and storing the matched results; in response to receiving a user's uttered voice from a user terminal apparatus, determining an index value from the received uttered voice; and searching a group corresponding to the index value determined from the received uttered voice, and performing the function corresponding to the uttered voice, thereby providing a voice recognition result of a variety of user's uttered voices suitable to the user's intentions.

18 Claims, 13 Drawing Sheets

(51) Int. Cl.
*G10L 15/19* (2013.01)
*G10L 15/18* (2013.01)
*G10L 15/22* (2006.01)

(58) Field of Classification Search
CPC ........... G06F 17/3071; G06F 17/30746; G06F 17/3002; G06F 17/2765; G06F 16/3344; G06F 16/35; G06F 16/243; G06F 16/3329; G06F 16/334; G06F 16/22; G06F 16/33; G06F 16/90332; G06F 16/332; G06F 16/632; G06F 16/90335; G10L 15/142; G10L 15/183; G10L 15/22; G10L 15/26; G10L 15/063; G10L 15/16; G10L 15/18; G10L 15/1822; G10L 2015/0635; G10L 15/265; G10L 15/08; G10L 15/144; G10L 2015/088; G10L 2015/225; G06K 9/00771; G06K 9/6226; G06K 9/6297
See application file for complete search history.

(56) References Cited

U.S. PATENT DOCUMENTS

| | | | |
|---|---|---|---|
| 7,225,128 | B2 | 5/2007 | Kim et al. |
| 7,373,301 | B2 | 5/2008 | Kemp et al. |
| 7,412,383 | B1* | 8/2008 | Alonso ................. G10L 15/063 704/236 |
| 7,451,079 | B2 | 11/2008 | Oudeyer |
| 7,684,984 | B2 | 3/2010 | Kemp |
| 8,204,747 | B2 | 6/2012 | Kato et al. |
| 8,589,164 | B1 | 11/2013 | Mengibar et al. |
| 8,606,575 | B1* | 12/2013 | Witt-ehsani .......... G10L 15/063 704/1 |
| 8,768,698 | B2 | 7/2014 | Mengibar et al. |
| 8,868,402 | B2* | 10/2014 | Korolev ............. G06F 17/2785 704/1 |
| 2003/0229497 | A1 | 12/2003 | Wilson et al. |
| 2004/0236577 | A1* | 11/2004 | Nishitani .............. G10L 15/144 704/256 |
| 2004/0249628 | A1* | 12/2004 | Chelba ................ G06F 17/2715 704/4 |
| 2007/0130112 | A1* | 6/2007 | Lin ..................... G06F 17/3002 |
| 2007/0244692 | A1* | 10/2007 | Balchandran ....... G06F 17/2715 704/9 |
| 2007/0299838 | A1* | 12/2007 | Behrens ............. G06F 17/30681 |
| 2008/0133479 | A1* | 6/2008 | Zelevinsky ......... G06F 17/3071 |
| 2009/0326936 | A1 | 12/2009 | Nagashima |
| 2010/0153105 | A1* | 6/2010 | Di Fabbrizio ........ G06F 17/279 704/235 |
| 2010/0246799 | A1 | 9/2010 | Lubowich et al. |
| 2012/0089396 | A1 | 4/2012 | Patel et al. |
| 2013/0054242 | A1* | 2/2013 | Shaw ..................... G10L 15/10 704/239 |
| 2014/0114661 | A1 | 4/2014 | Mengibar et al. |
| 2014/0244254 | A1 | 8/2014 | Ju et al. |
| 2015/0032443 | A1 | 1/2015 | Karov et al. |
| 2015/0194149 | A1* | 7/2015 | Faizakof ............. G10L 15/1815 704/257 |
| 2015/0221304 | A1 | 8/2015 | Stewart |
| 2016/0042053 | A1* | 2/2016 | De Sousa Webber ....................... G06F 17/30011 707/739 |
| 2016/0098393 | A1* | 4/2016 | Hebert .................... G06F 17/28 704/9 |
| 2016/0247061 | A1* | 8/2016 | Trask ........................ G06N 3/04 |
| 2016/0259780 | A1* | 9/2016 | Panemangalore .... G06F 9/4443 |
| 2016/0260430 | A1* | 9/2016 | Panemangalore .... G06F 17/289 |
| 2016/0283463 | A1* | 9/2016 | M R ..................... G06F 16/243 |
| 2017/0053025 | A1* | 2/2017 | De Sousa Webber ....................... G06F 17/30699 |
| 2017/0053646 | A1* | 2/2017 | Watanabe ........... G10L 15/1822 |
| 2017/0060835 | A1* | 3/2017 | Radford ............... G06F 17/277 |

FOREIGN PATENT DOCUMENTS

| | | |
|---|---|---|
| KR | 10-2003-0046444 | 6/2003 |
| KR | 10-2003-0078388 | 10/2003 |
| KR | 10-2015-0048252 A | 5/2015 |

OTHER PUBLICATIONS

PCT Search Report for PCT/KR2016/002614 dated Jun. 30, 2016.
PCT Written Opinion for PCT/KR2016/002614 dated Jun. 30, 2016.
Extended European Search Report for EP Application No. 16846706.6 dated Jul. 19, 2018.
Han et al., "NLify: Third-Party Programming Support for Spoken Natural Language Interfaces", MSR-TR-2012-128 XP055135616.
Mikolov et al., "Efficient Estimation of Word Representations in Vector Space"; Jan. 16, 2013, XP055192736.
Wong et al., "A Vector Space Model for Automatic Indexing", vol. 18, No. 11, Nov. 1, 1975, XP058401416.
EP Examination Report dated Jan. 31, 2019 for EP Application No. 16846706.6.
Danisman et al., "Feeler: Emotion Classification of Text Using Vector Space Model", Apr. 4, 2008, XP055284630.

* cited by examiner

VOICE RECOGNITION SERVER AND CONTROL METHOD THEREOF

CROSS-REFERENCE TO RELATED APPLICATION

This application is based on and claims priority under 35 U.S.C. § 119 to Korean Patent Application No. 10-2015-0131122, filed on Sep. 16, 2015, in the Korean Intellectual Property Office, the disclosure of which is incorporated by reference herein in its entirety.

BACKGROUND

Field

Example apparatuses and methods of the disclosure relate generally to a voice recognition server and a control method thereof, and for example, to a voice recognition server configured to provide a result of voice recognition in response to a voice uttered by a user, and a control method thereof.

Description of Related Art

A general voice recognition server configured to provide a result of voice recognition in response to a user's uttered voice in a dialogue type system analyzes a sentence of a text in a received uttered voice using a pre-defined rule module, and then provides a result of voice recognition that is suitable to the user's intentions.

More specifically, a conventional voice recognition server analyzes a sentence structure of a user's uttered voice by matching a text of the user's uttered voice to a sentence pattern to which a pre-defined rule model has been applied, or by matching the text to a sentence pattern determined as being similar in terms of probability. Then, the voice recognition server extracts from the analyzed sentence structure a named entity (NE) that is the purpose of the user's uttered voice and execution information to be performed in the named entity (NE). Then, the voice recognition server may provide a voice recognition result in response to the user's uttered voice based on the extracted named entity and the execution information.

However, such a conventional method for analyzing a sentence structure of an uttered voice has the following problems.

That is, the method for analyzing a sentence structure by matching a text of a user's uttered voice to a sentence pattern to which a pre-defined rule model has been applied is capable of identifying the exact intentions of the user so as to provide a voice recognition result suitable to the user's intentions.

However, in the above analyzing method, in order to analyze a sentence structure, a text of a user's uttered voice must be matched to a sentence pattern to which a pre-defined rule model has been applied, and thus it requires a large amount of computation, which is a problem.

Meanwhile, the method of analyzing a sentence structure of a user's uttered voice by matching a text of the user's uttered voice to a sentence pattern determined as being similar in terms of probability is capable of analyzing the sentence structure with a relatively small amount of computation compared to the aforementioned analyzing method. However, this method is more likely to provide a voice recognition result that is unsuitable to the user's intention than the aforementioned analyzing method.

Not only that, in the case of the aforementioned analyzing method, since a sentence structure is analyzed using a pre-defined rule model, if a text of the user's uttered voice does not satisfy the pre-defined rule model, it may not be able to provide a voice recognition result in response to the user's uttered voice, which is also a problem.

SUMMARY

Various example embodiments of the disclosure are directed to address the problems of prior art, to enable providing a voice recognition result in response to a variety of uttered voices.

Furthermore, the disclosure provides a voice recognition result in response to a user's uttered voice that includes a sentimental meaning as well.

According to an example embodiment of the disclosure, a method for controlling a voice recognition server is provided, the method including determining an index value for each of a plurality of training texts; setting a group for each of the plurality of training texts based on the index values of the plurality of training texts, and matching a function corresponding to each group and storing the matched results; in response to receiving a user's uttered voice from a user terminal apparatus, computing an index value from the received uttered voice; and searching a group corresponding to the index value computed from the received uttered voice, and performing the function corresponding to the uttered voice.

The determining an index value for each training text may include dividing the training text into meaning units; determining the index value having the meaning units as scalar or vector values; and tagging the determined index value to each of the meaning units.

The index value may be a value that is located at one point within a continuous space.

The index value may be determined using a Skip-Gram method.

The storing the matched results may include setting a group of the plurality of training texts and of the meaning units that comprise each of the plurality of training texts based on a similarity of the index value and a distance between the index value and locations of a pre-defined plurality of groups; setting a function corresponding to the set group; and tagging the function to the group and storing the tagged result.

The setting a group may include setting at least one of an average value of the index values included in the group and an index value closest to the average value as the index value of the group.

The setting a function may include setting at least one of a command processing function, intention processing function and sentiment processing function as the function that corresponds to the group, based on a user command.

The determining an index value from the received uttered voice may include dividing a text recognized from the uttered voice into meaning units; and determining the index value by expressing the meaning units divided from the text with scalar or vector values.

The performing the function may include selecting a group that corresponds to the determined index value among the pre-stored groups; and transmitting a voice recognition result corresponding to the function of the selected group to the user terminal apparatus.

The transmitting a voice recognition result may include, in response to the function of the selected group being the command processing function, transmitting a control command for controlling an operation of the user terminal apparatus to the user terminal apparatus, and in response to the function of the selected group being the intention processing function or sentiment processing function, transmitting at least one of a response message, a control message, and a search result of the uttered voice to the user terminal apparatus.

According to another example embodiment of the disclosure, a voice recognition server is provided, including a first processing part configured to determine an index value of each of a plurality of training texts; group setter processing circuitry configured to set a group for each of the plurality of training texts based on the index values of the plurality of training texts, and to match a function corresponding to each group and to store the matched results; a second processing part configured to, in response to receiving a user's uttered voice from a user terminal apparatus, determine an index value from the received uttered voice; and a function processor configured to search a group corresponding to the index value determined from the received uttered voice, and to perform the function corresponding to the uttered voice.

The first processing part may include a first text divider processing circuitry configured to divide the training text into meaning units; a first meaning index processing circuitry part configured to determine the index value having the meaning units divided by the first text divider processing circuitry as scalar or vector values; and an index tagging processing circuitry configured to tag the index value determined by the first meaning index processing circuitry part to each of the meaning units.

The index value may be a value that is located at one point within a continuous space.

The index value may be determined using a Skip-Gram method.

The group setter processing circuitry may include an index assembly processing circuitry part configured to set a group of the plurality of training texts and of the meaning units that comprise each of the plurality of training texts based on a similarity of the index value and a distance between the index value and locations of a pre-defined plurality of groups; and function setter processing circuitry configured to set a function corresponding to the set group, and to tag the function to the group and store the tagged result.

The group setter processing circuitry may further include a group index processing circuitry part configured to set at least one of an average value of the index values included in the group and an index value closest to the average value as the index value of the group.

The function setter processing circuitry may set at least one of a command processing function, intention processing function and sentiment processing function as the function that corresponds to the group, based on a user command.

The second processing part may include a second text divider processing circuitry configured to divide a text recognized from the uttered voice into meaning units; and a second meaning index processing part configured to determine the index value by expressing the meaning units divided from the text with scalar or vector values.

The function processor may be configured to select a group that corresponds to the determined index value among the pre-stored groups; and to transmit a voice recognition result corresponding to the function of the selected group to the user terminal apparatus.

The function processor, in response to the function of the selected group being the command processing function, may be configured to transmit a control command for controlling an operation of the user terminal apparatus to the user terminal apparatus, and in response to the function of the selected group being the intention processing function or sentiment processing function, to transmit at least one of a response message, control message, and search result of the uttered voice to the user terminal apparatus.

According to the aforementioned various example embodiments of the disclosure, a voice recognition server of a dialogue type system is capable of providing a voice recognition result that is suitable to the user's intentions for a variety of user's uttered voices.

BRIEF DESCRIPTION OF THE DRAWINGS

The above and/or other aspects of the disclosure will be more apparent from the following detailed description, taken in conjunction with the the accompanying drawings, in which like reference numerals refer to like elements, and wherein.

DETAILED DESCRIPTION

Figure 1:
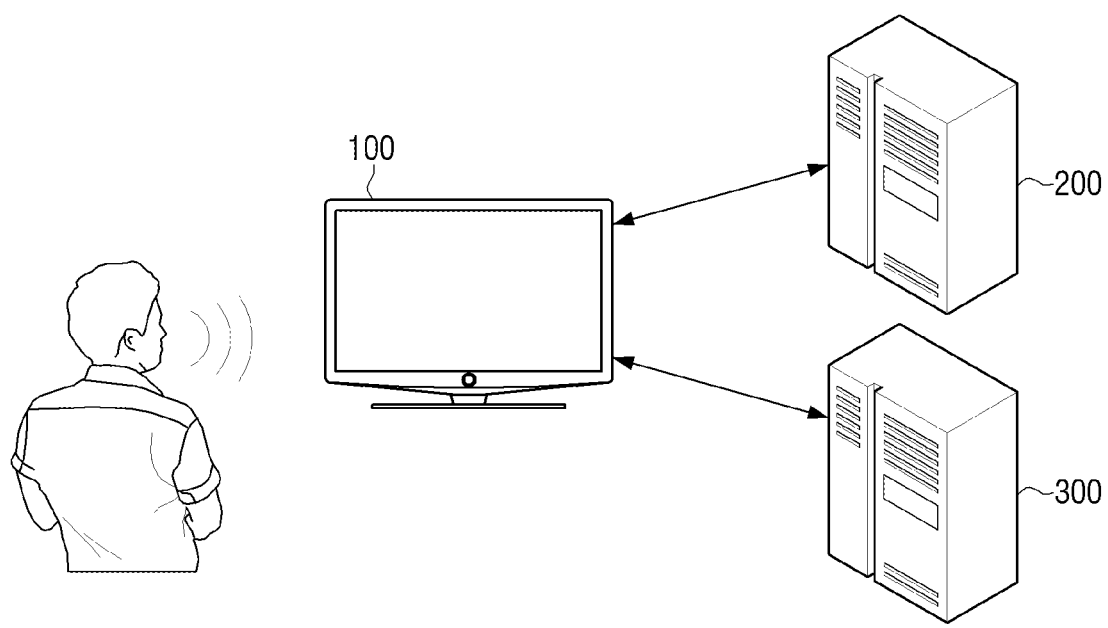
FIG. 1 is a diagram illustrating an example dialogue type system configured to provide a voice recognition result suitable to a user's uttered voice.

Prior to explaining the disclosure, the method of disclosing the example embodiments and the drawings will be explained below.

The words used in the disclosure and in the claims were selected from generally used terms in consideration of the functions of various example embodiments of the disclosure. However, the meanings of these words may vary depending on the intentions of one skilled in the art, technical interpretation, and advent of a new technology. Furthermore, some of the words herein may have been randomly selected. These words may be interpreted to have meanings defined in this disclosure, and unless there are specific definitions, they may be interpreted based on the overall disclosure and the general technical common sense of one skilled in the art.

Furthermore, like reference numerals in the drawings refer to like parts or components that perform substantially the same functions. For the sake of easy understanding an explanation, like reference numerals will be used in different example embodiments as well. For example, even if like reference numerals are used in a plurality of drawings, it does not necessarily mean that all the drawings belong to the one same example embodiment.

Furthermore, words that include ordinal numerals such as "the first" and "the second" may be used to differentiate between the components in this disclosure and in the claims. These ordinal numerals are used to differentiate between the same or similar components, and thus the use of such ordinal numerals is not intended to limit the meanings of the words. For example, the order of use or order of arrangement of a component combined with such an ordinal numeral shall not be limited by that ordinal numeral. When necessary, the ordinal numerals may be exchanged between one another.

Unless mentioned otherwise, any singular expression includes a plural expression. In the disclosure, words such as "include" or "consist of" are used to designate that the characteristics, numbers, steps, operations, components, parts or a combination thereof disclosed exist, but not to exclude the possibility of existence or addition of one or more of other characteristics, numbers, steps, operations, components, parts or a combination thereof.

Words such as "module", "unit", and "part" may be used to indicate a component that performs one or more functions or operations, and such a component may be realized in a software or hardware (e.g., circuitry), or as a combination thereof. Furthermore, a plurality of "modules", "units" and "parts" may be integrated into at least one module or chip and thus be realized in at least one processor (not illustrated) besides the cases where each of them has to be realized in certain hardware.

Furthermore, in an example embodiment of the disclosure, a part being connected to another part includes the part being connected to the another part indirectly via another medium. Furthermore, a part including another component means that any other component may also be further included unless mentioned otherwise.

Hereinafter, various example embodiments of the disclosure will be explained with reference to the accompanying drawings.

FIG. 1 is a diagram illustrating an example dialogue type system configured to provide a voice recognition result suitable to a user's uttered voice.

As illustrated in FIG. 1, the dialogue type system includes a user terminal 100, voice recognition apparatus 200 and voice recognition server 300.

The user terminal apparatus 100 may, for example, be an apparatus configured to recognize a user's uttered voice so as to perform an operation intended by the user. The user terminal apparatus 100 may, for example, be realized as one of a variety of electronic apparatuses such as a smart TV, smart phone, tablet PC and the like.

The voice recognition apparatus 200 converts a voice signal of a user's uttered voice received from the user terminal apparatus 100 into a text format, and transmits the voice recognition result converted into the text format to the user terminal apparatus 100. However, there is no limitation thereto, and thus, in a case where data communication is not performed between the user terminal apparatus 100 and voice recognition apparatus 200, or where an uttered voice is input through a microphone (not illustrated), the user terminal apparatus 100 may convert a voice signal of a user's uttered voice into a text format instead.

In response to the text converted from the user's uttered voice being received, the voice recognition server 300 transmits to the user terminal apparatus 100 a voice recognition result in response to the user's uttered voice based on the text of the received uttered voice.

For example, with the user terminal apparatus 100 operating in a voice recognition mode, the user may make an inquiry-related utterance regarding a piece of information that he/she wants to receive through the user terminal apparatus 100. In an example embodiment, in response to a user's uttered voice being input through the microphone (not illustrated), the user terminal apparatus 100 may perform a voice recognition regarding the user's uttered voice internally and convert it into a text.

In another example embodiment, in a case where a user's uttered voice is input through a remote control apparatus (not illustrated) such as a remote control, or where it is impossible to convert the user's uttered voice into a text in the user terminal apparatus 100, the user terminal apparatus 100 transmits a voice signal of the user's uttered voice to the voice recognition apparatus 200. The voice recognition apparatus 200 converts the voice signal of the uttered voice received from the user terminal apparatus 100 into a text format, and transmits a voice recognition result in response thereto. In an example embodiment, the voice recognition apparatus 200 may convert a received user's uttered voice into a text using, for example, an STT (Speech to Text) algorithm.

In response to a text of a user's uttered voice being received or generated through such various example embodiments, the user terminal apparatus 100 transmits the text of the user's uttered voice to the voice recognition server 300. The voice recognition server 300 analyzes the text of the user's uttered voice received from the user terminal apparatus 100, and transmits a voice recognition result in response to the user's uttered voice to the user terminal apparatus 100.

For example, the voice recognition server 300 may, for example, set a group for each of a plurality of training texts based on those training texts received through various routes, match a function to each of group set, and then store the matched result. Such a voice recognition server 300 that stores the groups of the plurality of training texts, in response to receiving from the user terminal apparatus 100 a text converted from a user's uttered voice, selects a group for the received text based on the similarity between the training texts included in the plurality of pre-stored groups and the received text. The voice recognition server 300 transmits a voice recognition result corresponding to the function of the selected group to the user terminal apparatus 100.

In an example embodiment, in response to the function of the selected group being a command processing function, the voice recognition server 300 transmits a control command for controlling an operation of the user terminal apparatus 100 to the user terminal apparatus 100. In response to the function of the selected group being an intention processing function or a sentiment processing function, the voice recognition server 300 transmits at least one of a response message, control command and search result for the user's uttered voice to the user terminal apparatus 100.

The user terminal apparatus 100 may be configured to perform a control operation intended by the user or display a response message or search result of the user's uttered voice based on the voice recognition result received from the voice recognition server 300.

The voice recognition server 300 for providing a voice recognition result in response to the user's uttered voice and the voice recognition apparatus 200 for converting a user's uttered voice into a text may, for example, be integrated in one component. In such an example, in response to receiving a voice signal of a user's uttered voice, the voice recognition server 300 may convert the received voice signal into a text, and then provide a voice recognition result in response to the user's uttered voice based on the converted text.

A general explanation of operations of a dialogue type system according to the disclosure has been provided. Components of the voice recognition server 300 according to the disclosure will be explained in greater detail below.

Figure 2:
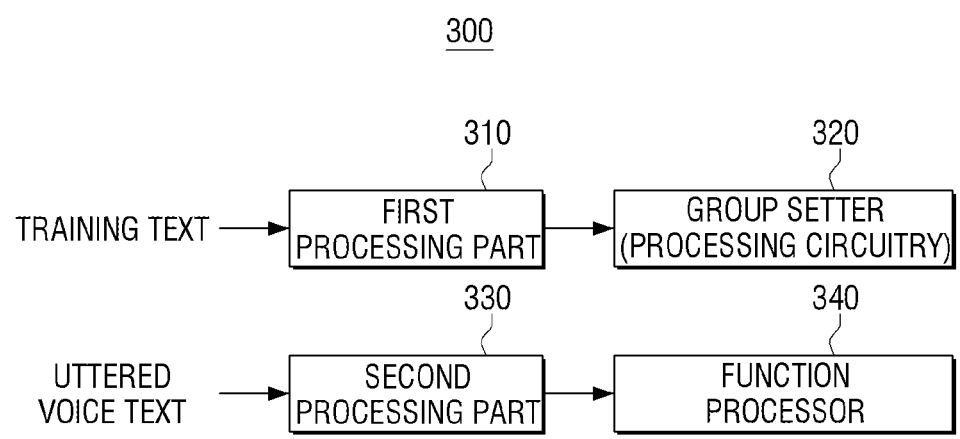
FIG. 2 is a block diagram illustrating an example voice recognition server.

FIG. 2 is a block diagram illustrating an example voice recognition server.

As illustrated in FIG. 2, the voice recognition server 300 may include a first processing part (e.g., including processing circuitry) 310, group setter (e.g., including group setter processing circuitry) 320, second processing part (e.g., including processing circuitry) 330 and function processor 340.

The first processing part 310 may be configured to determine an index value from a plurality of training texts received. The training texts may include, for example, information input through various routes, for example, web documents being provided from a web server (not illustrated).

The group setter processing circuitry 320 may be configured to set a group for each of the plurality of training texts based on the index values determined from the plurality of training texts, and then matches a function corresponding to each group and then stores the matched result.

In response to receiving a text of a user's uttered voice from the user terminal apparatus 100, the second processing part is configured to determine an index value for the received uttered voice from the text.

That is, the first processing part 310 computes an index value from a plurality of training texts received. And, in response to receiving a text of a user's uttered voice from the user terminal apparatus 100, the second processing part 330 computes an index value for the received uttered voice from the text.

The function processor 340 may be configured to search a group corresponding to the index value determined from the text of the uttered voice, and to perform a function corresponding to the user's uttered voice.

The aforementioned first processing part 310, group setter processing circuitry 320, second processing part 330 and function processor 340 will be explained in greater detail below.

Figure 3:
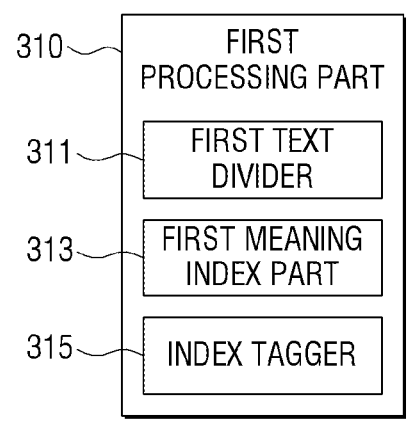
FIG. 3 is a block diagram illustrating an example first processing part.

FIG. 3 is a block diagram illustrating an example first processing part.

As illustrated in FIG. 3, the first processing part 310 includes a first text divider 311, first meaning index part 313 and index tagger 315.

The first text divider (e.g., including processing circuitry) 311 divides the received plurality of training texts into meaning units, and the first meaning index part (e.g., including processing circuitry) 313 determines an index value having the meaning units divided by the text divider 311 as scalar or vector values. The index tagger (e.g., including processing circuitry) 315 tags the index value determined by the first meaning index part 315 per meaning unit.

For example, when the plurality of training texts are received, the first text divider 311 divides each of the received training texts into meaning units. A meaning unit may, for example, refer to a unit from a sentence corresponding to a training text that has a meaning, and such a unit that has a meaning may, for example, be of one of various formats such as a word, phrase, sentence and paragraph. The meaning unit may be referred to herein as a meaning unit text.

For example, in response to receive a training text, 'program where ○○○ appeared', the first text divider 311 may divide the training text, 'program where ○○○ appeared', into meaning unit texts of, '○○○', 'appeared', and 'program'.

When the training text is divided into meaning unit texts as described above, the first meaning index part 313 determines an index value having the meaning unit texts as, for example, scalar or vector values. An index value may, for example, include a value located at one point inside a continuous space, and in an example embodiment, the index value may be determined using, for example, a Skip-Gram method.

However, there disclosure is not limited thereto, and thus the first meaning index part 313 may determine an index value of a meaning unit text using, for example, an N Gram method.

When an index value of a meaning unit text is determined through the first meaning index part 313 as described above, the index tagger 315 tags the index value determined per meaning unit text to each meaning unit text.

Figure 4:
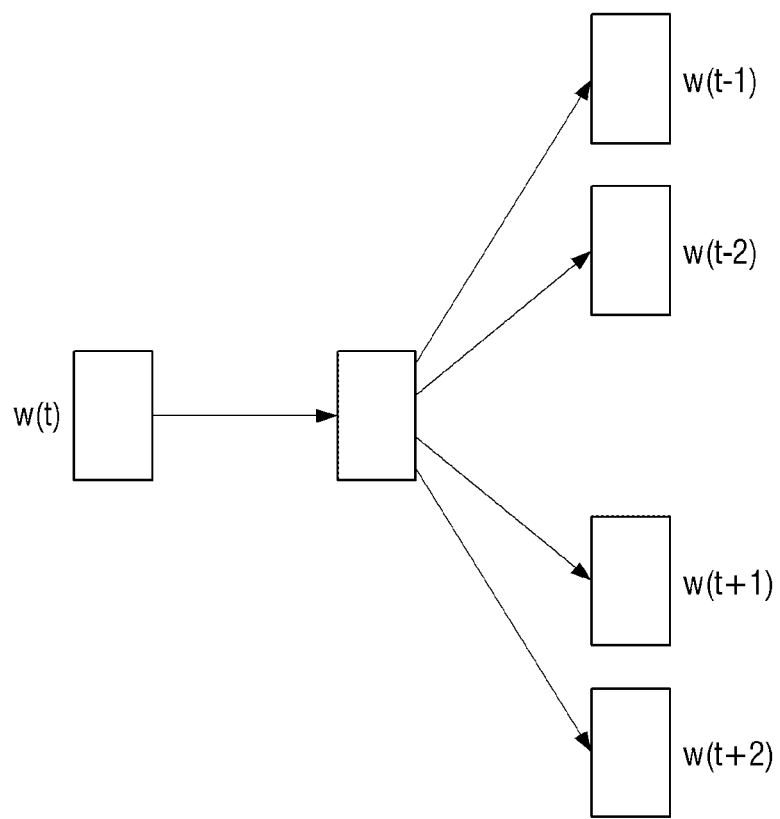
FIG. 4 is a block diagram illustrating an example first meaning index part determining an index value of a meaning unit text.

FIG. 4 is a diagram illustrating an example of determining an index value of a meaning unit text in a first meaning index part.

As illustrated in FIG. 4, when one meaning unit text ($W(t)$) is input in a vector format, the first meaning index part 313 may, for example, multiply the vector value of the input meaning unit text ($W(t)$) by a weighted value per element, and then multiply a vector value of a context that includes the meaning unit text ($W(t)$) by the weighted value based on the vector value of the meaning unit text ($W(t)$) to which the weighted value has been multiplied. The context may, for example, be a text ($W(t-1)$, $W(t-2)$, $W(t+1)$, $W(t+2)$) of neighboring words related to the meaning unit text ($W(t)$).

Such a text ($W(t-1)$, $W(t-2)$, $W(t+1)$, $W(t+2)$) of the neighboring words related to the meaning unit text ($W(t)$) may be determined, for example through Softmax, and its value may, for example, be the probability that a text of neighboring words related to the meaning unit text ($W(t)$) will be collected.

The first meaning index part 313 compares the vector value of the context that includes the meaning unit text ($W(t)$) with the vector value to which the weighted value of the context has been multiplied, and determines the difference between the two vector values as an error value. The first meaning index part 313 changes the weighted value using, for example, a downward slope algorithm and reduces the difference of the error value. Therefore, if the modified error value satisfies a final convergence condition, the first meaning index part 313 applies the weighted value used to derive the error value that satisfies the final convergence condition to the vector value of the meaning unit text ($W(t)$).

The vector value of the meaning unit text ($W(t)$) may have a similar value as the vector value of the text ($W(t-1)$, $W(t-2)$, $W(t+1)$, $W(t+2)$) regarding the neighboring word.

Such a Skip-Gram method is a well known technology, and thus explanation thereof will be omitted in the disclosure.

When an index value of each meaning unit text is determined through such an example embodiment, the index tagger 315 may tag the index value determined per meaning unit text to each meaning unit text.

When the index value corresponding to each meaning unit text divided from the training text is determined, the aforementioned first meaning index part 313 may determine an index value for the corresponding training text based on the index value determined from each meaning unit text.

In an example embodiment, the first meaning index part 313 may determine a sum of the index values determined from the meaning unit texts comprising the training text as the index value of the training text.

In another example embodiment, the first meaning index part 313 may determine an average value of the index values determined from the meaning unit texts that comprise the training text as the index value of the training text.

The index tagger 315 may not only tag an index value determined per meaning unit text to each meaning unit text but also tag an index value for the training text that includes the meaning unit texts to the training text.

When an index value is tagged for a plurality of training texts and for each meaning unit text comprising a training text, the group setter 320 may set a group for each of the plurality of training texts based on the tagged index value.

An example group setter 320 according to the disclosure will be explained in greater detail below.

Figure 5:
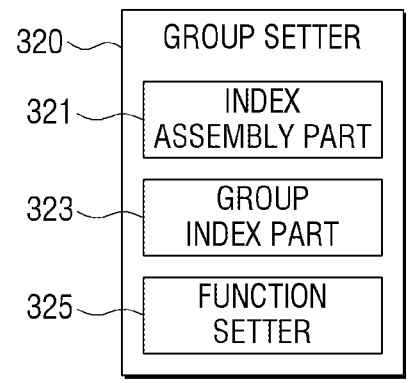
FIG. 5 is a block diagram illustrating an example group setter processing circuitry.

FIG. 5 is a block diagram illustrating an example group setter.

As illustrated in FIG. 5, the group setter (e.g., including processing circuitry) 320 may include an index assembly part (e.g., including processing circuitry) 321, group index part (e.g., including processing circuitry) 323 and function setter (e.g., including processing circuitry) 325.

The index assembly part 321 sets a group of a plurality of training texts and of meaning units comprising each of the plurality of training texts based on the similarity of index values tagged through the index tagger 315 of the first processing part 310 and distances between each index value and locations of the plurality of pre-defined groups.

The group index part 313 sets at least one of an average value of the index values included in a set group and the index value that is closest to the average value as the index value of that group, and the function setter 325 tags a function corresponding to a user command to that group and stores the same.

For example, when an index value is tagged to each of the plurality of training texts through the index tagger 315, the index assembly part 321 assembles the plurality of training texts based on the similarities between the tagged index values. When an index value is tagged to meaning unit texts comprising each of the plurality of training texts through the index tagger 315, the index assembly part 323 assembles the meaning unit texts based on the similarities between the tagged index values.

The index assembly part 321 sets an assembled group of the plurality of training texts or the meaning unit texts by adjusting the locations of n groups in a direction where a sum of the distances between the locations of the pre-defined n groups and each of the assembled index values becomes, for example, minimum.

In an example embodiment, the index assembly part 321 measures a Euclidean Distance between the locations of the n pre-defined groups and each of the assembled index values using, for example, the K-mean method. The index assembly part 321 sets the assembled group of the plurality of training texts or meaning unit texts by adjusting the locations of n groups in a direction where a sum of the measured distances and distances between the locations of the n pre-selected group becomes, for example, minimum.

For example, the index value of the first training text, 'program where ○○○ appeared' may be similar to the index value of the second training text, 'What program does ○○○ do?', the index value of the third training text, 'program where ○○○ starred', the index value of the fourth training text, 'Where does ○○○ appear these days?', and the index value of the fifth training text 'What is the program that ○○○ appeared?'. In this example, the index assembly part 321 assembles the index values of the first to fifth training texts. Among the locations of the n pre-defined groups, the index assembly part 321 selects a group close to an area where the index values of the first to fifth training texts are assembled, and measures a distance between the location of the selected group and an index value of each of the first to fifth training texts. The index assembly part 321 sets the group of the first to fifth training texts such that they exist within the moved group while moving the group in a direction where a sum of the measured distances and distances between the pre-selected group becomes, for example, minimum.

In another example, an index value of a first meaning unit text, '○○○', divided from the training text, 'program where ○○○ appeared', may be similar to an index value of a second meaning unit text, 'ΔΔΔ', index value of a third meaning unit text '◊◊◊', and an index value of a fourth meaning unit text, '□□□'. In this example, the index assembly part 321 assembles the first to fourth meaning unit texts having similar index values.

Among locations of n pre-defined groups, the index assembly part 321 selects a group close to the area where the index values of the first to fourth meaning unit texts are assembled, and measures a distance between the location of the selected group and the first to fourth meaning unit texts. The index assembly part 321 sets the group of the first to second training texts such that they exist within the moved group while moving the group in a direction where a sum of the measured distances and distances between the locations of the pre-selected group becomes, for example, minimum.

Among locations of n pre-defined groups, the index assembly part 321 selects a group close to an area where the index values of the first to fourth meaning unit texts are assembled, and measures a distance between the location of the selected group and each index value of the first to fifth training texts. The index assembly part 323 sets the group of the first to fifth training texts such that the first to fifth training texts exist within the moved group while moving the group in a direction where a sum of the measured distances and distances between the locations of the pre-selected group becomes, for example, minimum.

When a group of the plurality of training texts is set, the group index assembly part 325 sets an index value of the group based on the index values of the first to fifth training texts included in the predetermined group.

In an example embodiment, the group index part 325 may set an average value of the index values of the first to fifth training texts included in the group as the index value of the group.

In another example embodiment, the group index part 325 may set an index value that is the closest to the average value of the index values of the first to fifth training texts included in the group as the index value of the group.

In another example embodiment, the group index part 325 may set the highest or lowest index value among the index values of the first to fifth training texts included in the group as the index value of the group.

When a group for the plurality of training texts is set and an index value for each group is determined, the function setter 325 sets a function for providing a voice recognition result in response to the user's uttered voice in each group. The function set in each group may, for example, be at least one of a command processing function, intention processing function and sentiment processing function.

The command processing function may, for example, be a function for controlling an operation of the user terminal apparatus 100 based on a user's uttered voice. The intention processing function may, for example, be a function for transmitting to the user terminal apparatus at least one of a response message, control command and search result of the user's uttered voice from a sentence configuration of the text of the user's uttered voice. The sentiment processing function may, for example, be a function for transmitting to the user terminal apparatus at least one of a response message, control command, and search result of the user's uttered voice based on a sentiment analyzed based on the user's uttered voice.

FIGS. 6A-6D are diagrams illustrating an example of setting a group of a plurality of training texts or meaning unit texts in a group setter.

Figure 6A:
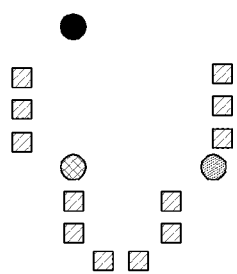
FIGS. 6A-6D are diagrams illustrating an example of setting a group for a plurality of training texts or meaning unit texts in a group setter.

As illustrated in FIG. 6A, a plurality of training texts may, for example, be assembled based on the similarities of index values tagged to each of the plurality of training texts. When the plurality of training texts are assembled, the index assembly part 321 sets a group of the plurality of training texts based on a distance between the index values of the plurality of training texts and location of the pre-defined groups.

Figure 6B:
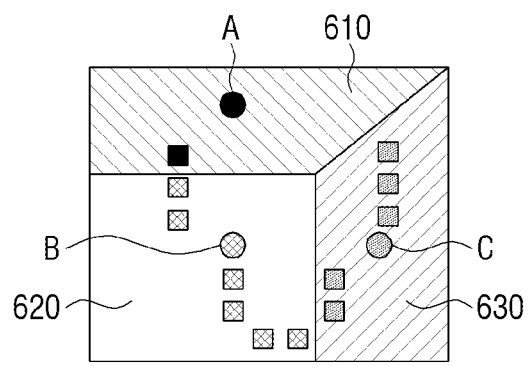

As illustrated in FIG. 6B, when points A, B, and C are selected based, for example, on a user setting, the plurality of training texts may be classified within three groups 610, 620, 630. For example, the first group 610 may include one training text based on point A, the second group 620 may include six training texts based on point B, and the third group 630 may include five training texts based on point C.

Figure 6C:
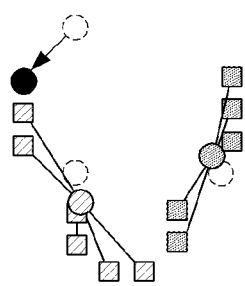

When a primary setting is made for the plurality of training texts based on the extent of distances between the index values of the plurality of training texts and each point A, B, and C within the first to third groups 610, 620, 630, the index assembly part 321 determines, for example, a minimum value from a sum of distances between the index value of the training text closest to each point A-C among the training texts included in the first to third groups 610, 620, 630. The index assembly part 321 may, for example, move each point A-C in a direction corresponding to the determined minimum value. For example, as illustrated in FIG. 6C, points A, B, and C may each be moved to a location where it is closest to at least one training text included in the first to third group 610, 620, 630.

Figure 6D:
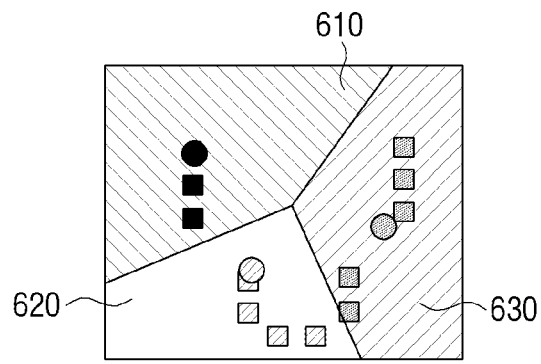

As illustrated in FIG. 6D, two training texts may be included in the first group 610, four training texts may be included in the the second group 620, and five training texts may be included in the third group 630.

When a setting is made such that the training texts are included in each of the first to third groups 610, 620, 630, the group index part 323 may determine the index value for the first to third group 610, 620, 630 based on the index value of the training texts included in each of the first to third group 610, 620, 630.

In an example embodiment, the group index part 323 may determine an average value from the index values of the training texts included in each of the first to third group 610, 620, 630, and determine the average value as the index value of the first to third group 610, 620, 630.

In another example embodiment, the group index part 323 may determine the index value of the training text closest to points A, B, and C as the index value of the first to third group 610, 620, 630 based on the distances between the index values of the training texts included in each of the first to third group 610, 620, 630 and each point A, B, and C within the first to third group 610, 620, 630.

Although the disclosure describes setting a group based on index values of a plurality of training texts, there is no limitation thereto, and thus it is possible to set a group of meaning unit texts that comprise a plurality of training texts by performing the aforementioned operations.

A more detailed explanation will be made of a second processing part 330 below.

Figure 7:
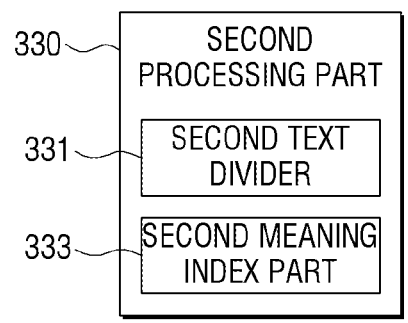
FIG. 7 is a block diagram illustrating an example second processing part.

FIG. 7 is a block diagram illustrating an example second processing part.

As illustrated in FIG. 7, the second processing part 330 may include, for example, a second text divider (e.g., including processing circuitry) 331 and second meaning index part (e.g., including processing circuitry) 333.

The second text divider 331 divides a text recognized from a user's uttered voice into meaning units (hereinafter referred to as meaning unit texts), and the second meaning index part 333 determines an index value of the text recognized from the user's uttered voice by expressing the divided meaning unit texts as, for example, scalar or vector values.

For example, when a text of a user's uttered voice is received, the second text divider 331 divides the received text into meaning unit texts. A meaning unit or meaning unit text may, for example, refer to a unit from a sentence corresponding to a text of a user's uttered voice that has a meaning, and such a unit that has a meaning may be of one of various formats such as a word, phrase, sentence and paragraph.

For example, in response to receiving a text of a user's uttered voice, 'program where ○○○ appeared', the second text divider 331 may, for example, divide the training text, 'program where ○○○ appeared', into meaning unit texts of '○○○', 'appeared', and 'program'.

When a text of a user's uttered voice is divided into meaning unit texts as described above, the second meaning index part 333 may determine an index value having the divided meaning unit texts as, for example, scalar or vector values. An index value may, for example, refer to a value located at one point within a continuous space. In an example embodiment, an index value may be determined using, for example, a Skip-Gram method.

The operation of determining an index value having meaning unit texts as scalar or vector value using the Skip-Gram method was explained in detail hereinabove in the explanation of the first text divider 311, and thus further explanation will be omitted here.

When an index value of a meaning unit text divided from a text of a user's uttered voice is determined by each configuration of the second processing part 330, the function processor 340 selects a group corresponding to the determined index value, and transmits a voice recognition result corresponding to the function of the selected group to the user terminal apparatus 100.

For example, in response to the function of the selected group being a command processing function, the function processor 340 transmits a control command for controlling an operation of the user terminal apparatus 100 to the user terminal apparatus 100. In response to the function of the selected group being a function processing function or sentiment processing function, the function processor 340 transmits at least one of a response message, control command and search result of the user's uttered voice to the user terminal apparatus 100.

For example, the function processor 340 determines an index value of a text of the user's uttered voice based on the index value determined from a meaning unit text divided from the text of the user's uttered voice.

In an example embodiment, the function processor 340 may determine the index value of the text of the user's uttered voice from a sum of the index values determined from the meaning unit texts divided from the text of the user's uttered voice. When the index value for the text of the user's uttered voice is determined, the function processor 340 compares the index value tagged to each of the pre-stored plurality of groups with the index value of the text of the user's uttered voice, and selects a group with, for example, the smallest difference of index value among the plurality of groups.

The function processor 340 creates a voice recognition result in response to the user's uttered voice based on the function set to the selected group, and transmits the result to the user terminal apparatus 100.

For example, for a group selected for a text of the uttered voice, 'Will you turn down the sound?', a command processing function may be set. Regarding the uttered voice, 'Will you turn down the sound?', training texts such as 'turn down the volume!', 'turn down the sound!', and 'reduce the sound!' within the group may be detected as training texts similar to the uttered voice, 'Will you turn down the sound?'. In this example, the function processor 340 compares the index value of the meaning unit text divided from the text of the uttered voice, 'Will you turn down the sound?', with the index value of the meaning unit text of the training text detected regarding the uttered voice, 'Will you turn down the sound?', and detects the training text most similar to the uttered voice, 'Will you turn down the sound?' among the predetected training texts. The function processor 340 determines an execution command script regarding the finally detected training text as a voice recognition result of the user's uttered voice, and transmits the determined execution command script to the user terminal apparatus 100.

The user terminal apparatus 100 may adjust the volume based on the execution command script received from the voice recognition server 300.

In another example, to a group selected regarding a text of an uttered voice, 'When is ○○○○ (broadcast program) on?', the intention processing function may be set. The uttered voice, 'When is ○○○○ (broadcast program) on?', training texts, 'When does ○○○○ (broadcast program) start?', 'When is ○○○○ (broadcast program) re-aired?', and 'Program where △△△ appears?', may be detected as training texts that are similar to the uttered voice, 'When is ○○○○ (broadcast program) on?'. In this example, the function processor 340 compares the index value of the meaning unit text divided from the text of the uttered voice, 'When does ○○○○ (broadcast program) start?', with the index value of the meaning unit text of a training text detected regarding the uttered voice, 'When does ○○○○ (broadcast program) start?', and detects a training text most similar to the uttered voice, 'When does ○○○○ (broadcast program) start?', among the pre-detected training texts. The function processor 340 determines a response message 'I like that program too' and broadcast time information on '○○○○ (broadcast program)' based on the execution command script regarding the finally detected training text and transmits the same to the user terminal apparatus 100.

The user terminal apparatus 100 may display broadcast time information while at the same time outputting the response message received from the voice recognition server 300 as an audio signal.

In another example, to a group selected for a text of an uttered voice, 'I'm so tired!,' a sentiment processing function may be set. For example, the context, 'I'm so tired!', may not be related to a control command or intention but be related to a sentiment element only. In response to a text of the uttered voice, 'I'm so tired!', being related to a group to which a negative sentiment processing function is set, the voice recognition server 300 detects a training text having a meaning similar to the uttered voice, 'I'm so tired!' within the group to which a negative sentiment processing function is set.

The function processor 340 compares the index value of the detected training text with the index value of the text of the uttered voice, and detects a training text having an index value that is similar to the index value of the text of the uttered voice, and transmits a response message, 'Good job' and contents suitable to that response message based on an execution command script of the detected training text.

The user terminal apparatus 100 may output the contents through a speaker or display while displaying the response message received from the voice recognition server 300.

Components of the voice recognition server 300 according to example embodiments of the disclosure have been explained in some detail. If the voice recognition server 300 according to the disclosure is realized in hardware, it may be illustrated as set forth, for example, in FIG. 8.

Figure 8:
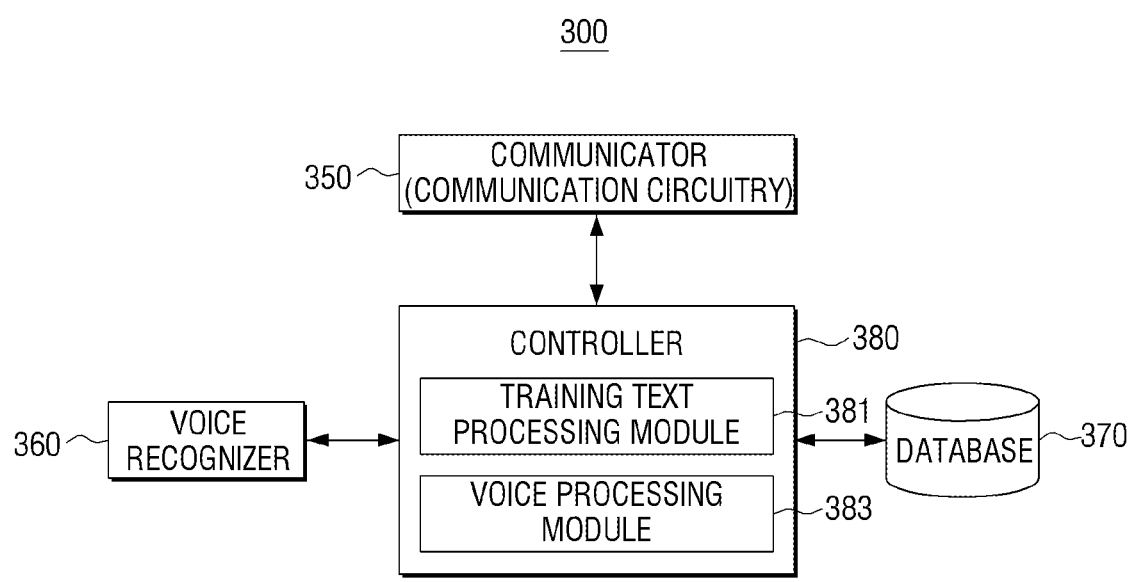
FIG. 8 is a block diagram illustrating an example overall configuration of a voice recognition server.

FIG. 8 is a block diagram illustrating an example overall configuration of a voice recognition server.

As illustrated in FIG. 8, the voice recognition server 300 may include a communicator (e.g., including communication circuitry) 350, voice recognizer (e.g., including processing circuitry) 360, database 370, and controller 380.

The communicator 350 performs data communication with the user terminal apparatus 100 to receive a text of a user's uttered voice from the user terminal apparatus 100 or to transmit a voice recognition result of the user's uttered voice to the user terminal apparatus 100.

Such a communicator 350 may include various communication modules (e.g., circuitry) such as, for example, a short distance communication module (not illustrated), and wireless communication module (not illustrated), or the like. The short distance wireless communication module (not illustrated) may, for example, include a communication module configured to perform wireless communication with the user terminal apparatus 100 located within a short distance or with an external server (not illustrated), for example, a Bluetooth and Zigbee and the like. The wireless communication module (not illustrated) may, for example, include a communication module configured to be connected to an external network according to a wireless communication protocol such as WiFi, IEEE and the like so as to perform data communication with an external server (not illustrated). Besides the above, the communicator 350 may include other mobile communication modules configured to be connected to a mobile communication network according to a variety of mobile communication standards such as 3G (3rd Generation), 3GPP (3rd Generation Partnership Project), and LTE (Long Term Evolution), or the like, to perform communication.

In an example in which the voice recognition server 300 performs voice recognition on a user's uttered voice, the voice recognizer 360 performs the voice recognition based on a voice signal of the user's uttered voice received from the user terminal apparatus 100, and converts the user's uttered voice into a text. In an example embodiment, the voice recognizer 360 may convert the user's uttered voice into a text using, for example, an STT (Speech to Text) algorithm.

The database 370 stores a plurality of training texts and an index value tagged to each training text. The database 370 stores grouping information of a grouped group based on the similarities between the index values tagged to each training text. The group information may include, for example, at least one of identification information of each group, index value tagged to each group, and functional information set to the group.

The controller 380 may be configured to control the overall operations of each component comprising the voice recognition server 300. For example, the controller 380 sets a group based on the similarities between the plurality of training texts, matches a function corresponding to the set group, and stores the matching result in the database 370. In response to receiving a text of a user's uttered voice from the user terminal apparatus 100, the controller 380 selects a group related to the received text with reference to the database 370, generates a voice recognition result corresponding to the user's uttered voice according to the function of the selected group, and transmits the voice recognition result to the user terminal apparatus 100.

The controller 380 that performs such an operation may include a training text processing module 381 and voice processing module 383.

The training text processing module 381 may, for example, include a processing module configured to perform the operations of the aforementioned first processing part 310 and group setter 320, and the voice processing module 383 may, for example, include a processing module configured to perform the operations of the aforementioned second processing part 330 and function processor 340.

For example, in response to receiving a plurality of training texts, the training text processing module 381 divides each training text into meaning unit texts, and determines an index value having the divided meaning unit texts as, for example, scalar or vector values. The training text processing module 381 determines an index value for the training text based on the index value of the meaning unit texts that comprise the training text. The training text processing module 381 sets a group for each of the plurality of training texts based on the determined index value, matches a function corresponding to the set group, and stores the matched result in the database 370.

In response to receiving a text of a user's uttered voice, the voice processing module 383 divides the text into meaning unit texts, and determines an index value having the divided meaning unit texts as, for example, scalar or vector values. The voice processing module 383 selects a group corresponding to the determined index value among the groups pre-stored in the database 360, generates a voice recognition result corresponding to the function of the selected group, and transmits the generated voice recognition result to the user terminal apparatus 100.

These operations of the training text processing module 381 and voice processing module 383 are similar to the aforementioned operations of the first processing part 310, group setter 320, second processing part 330 and function processor 340, and thus repeated explanation will be omitted.

Components of the example voice recognition server 300 have been explained in some detail above. An example method for controlling a voice recognition server 300 according to the disclosure will be explained in greater detail below.

Figure 9:
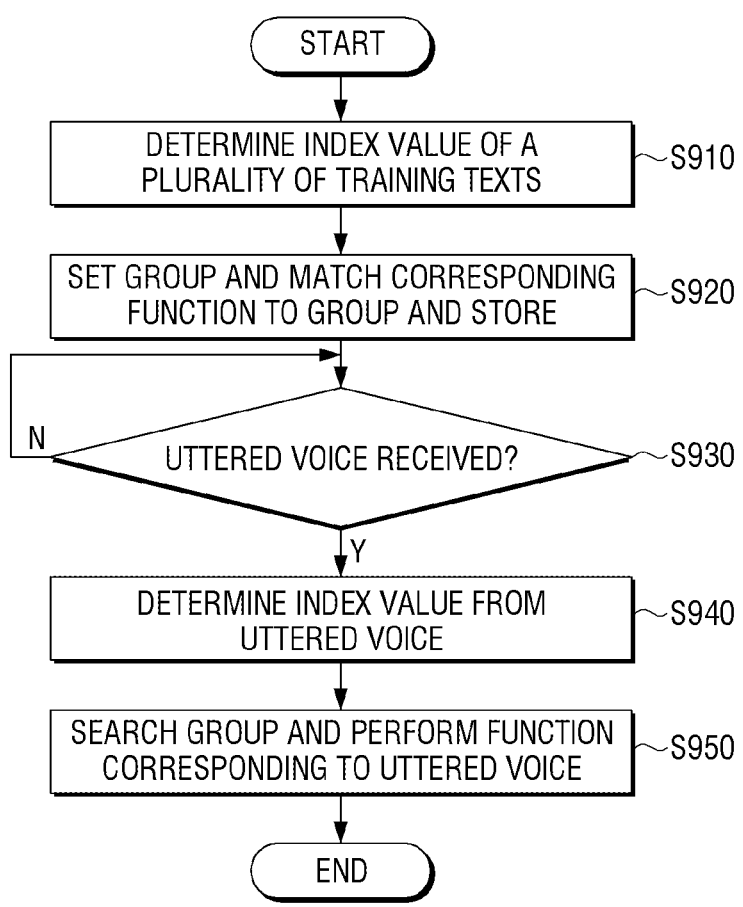
FIG. 9 is a flowchart illustrating an example method for controlling a voice recognition server.

FIG. 9 is a flowchart illustrating an example control method of a voice recognition server.

As illustrated in FIG. 9, in response to receiving a plurality of training texts, the voice recognition server 300 determines an index value for each of the plurality of training texts (S910). The training texts may, for example, include information input through various routes, for example, web documents being provided from web servers (not illustrated) may be received as training texts.

The voice recognition server 300 sets a group for each of the plurality of training texts based on the determined index values of the plurality of training texts, matches a function corresponding to each group, and stores the matched results (S920).

The voice recognition server 300 determines whether or not a text of a user's uttered voice has been received, and in response to determining that the text of the user's uttered voice has been received, the voice recognition server 300 determines an index value from the text of the user's uttered voice received (S930, S940). The voice recognition server 300 searches a group corresponding to the index value determined from the text of the uttered voice, and performs a function corresponding to the user's uttered voice (S950).

Figure 10:
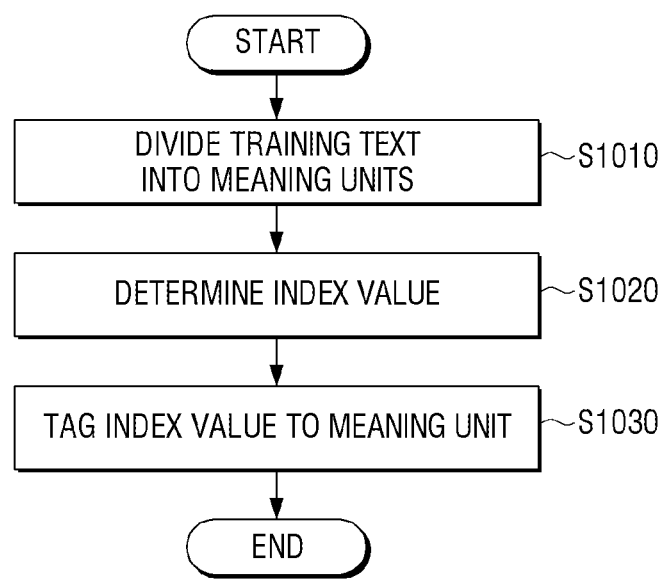
FIG. 10 is a flowchart illustrating an example method for determining an index value of a training text in a voice recognition server.

FIG. 10 is a flowchart illustrating an example method for determining an index value of a training text in a voice recognition server.

As illustrated in FIG. 10, in response to receiving a plurality of training texts, the voice recognition server 300 divides each of the plurality of training texts into meaning units (hereinafter referred to as meaning unit texts) (S1010). A meaning unit may, for example, refer to a unit from a sentence corresponding to a training text that has a meaning, and such a unit that has a meaning may, for example, be of one of various formats such as a word, phrase, sentence and paragraph.

When a training text is divided into meaning unit texts, the voice recognition server 300 determines an index value having the divided meaning unit texts as, for example, scalar or vector values (S1020). An index value may, for example, refer to a value that is located at one point within a continuous space, and in an example embodiment, an index value may be computed using, for example, a Skip-Gram method. However, there is no limitation thereto, and thus the voice recognition server 300 may determine an index value of a meaning unit text using, for example, an N gram method instead.

In response to an index value of a meaning unit text being determined, the voice recognition server 300 tags the determined index value to the meaning unit text (S1030). The voice recognition server 300 may determine an index value for a training text including meaning unit texts based on the index value determined for each meaning unit text.

In an example embodiment, the voice recognition server 300 may determine a sum of the index values determined for the meaning unit texts that comprise a training text as the index value of that training text.

In another example embodiment, the voice recognition server 300 may determine an average of the index values determined from the meaning unit texts that comprise the training text as the index value of the training text.

The voice recognition server 300 may not only tag the index value determined per meaning unit text to the meaning unit text but also tag the index value of the training text that includes the meaning unit texts to the training text.

Figure 11:
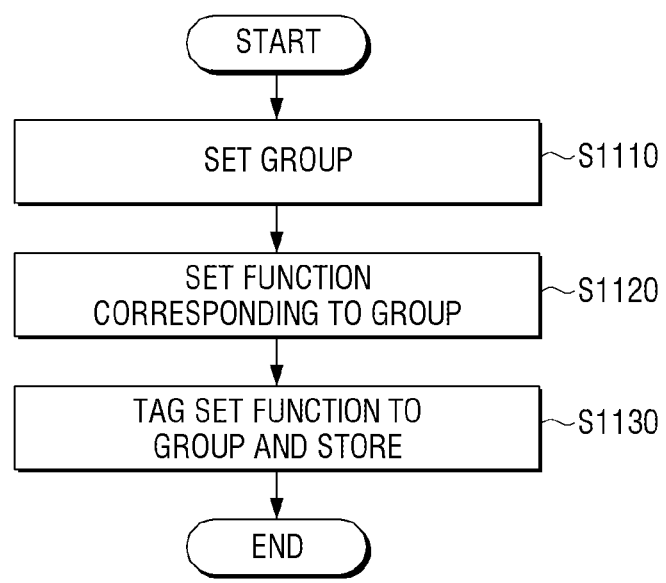
FIG. 11 is a flowchart illustrating an example method for setting a group for a plurality of training texts in a voice recognition server.

FIG. 11 is a flowchart illustrating an example method for setting a group of a plurality of training texts in a voice recognition server.

As illustrated in FIG. 11, in response to determining index values for meaning unit texts divided from a training text as explained above with reference, for example, to FIG. 10, the voice recognition server 300 sets a group of a plurality of training texts and of meaning unit texts comprising each training text based, for example, on distances between the determined index values and the locations of pre-defined groups (S1110). The voice recognition server 300 sets, for example, at least one of an average value of the index values included in the set group and the index value that is the closest to the average value as the index value of that group.

For example, an operation of setting a group for a training text may be performed as follows. For example, in response to an index value being tagged to each of a plurality of training texts, the voice recognition server 300 assembles the plurality of training texts based on the similarities between the tagged index values. The voice recognition server 300 may set an assembled group of the plurality of training texts by adjusting the locations of n pre-defined groups in a direction where a sum of the distances between the locations of the pre-defined n groups and each of the assembled index values becomes, for example, minimum.

In response to a group for the plurality of training texts being set, the voice recognition server 300 sets an index value for the group that includes the plurality of training texts. In an example embodiment, the voice recognition server 300 may set an average value of the index values of the plurality of training texts included in a group as the index value of that group. In another example embodiment, the voice recognition server 300 may set an index value that is the closest to the average value among the index values of the plurality of training texts included in a group as the index value of that group. In another example embodiment, the voice recognition server 300 may set the highest or lowest index value among the index values of the plurality of training texts included in a group as the index value of that group.

The voice recognition server 300 may set a function corresponding to a user command, and tag the set function to the corresponding group, and store the same (S1120, S1130).

Figure 12:
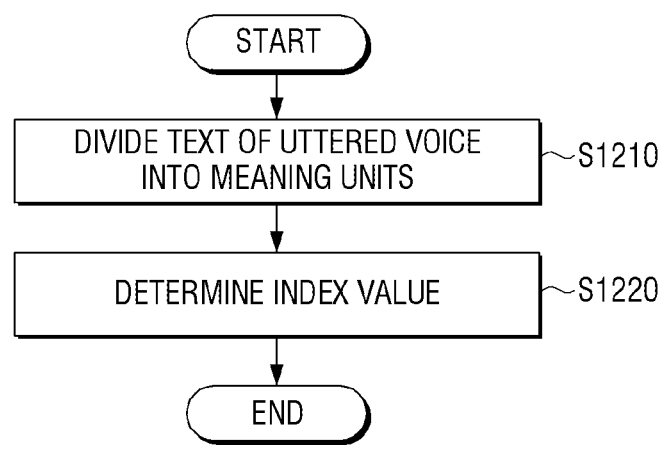
FIG. 12 is a flowchart illustrating an example method for determining an index value from a text of an uttered voice in a voice recognition server.

FIG. 12 is a flowchart illustrating an example method for determining an index value from a text of an uttered voice in a voice recognition server.

As illustrated in FIG. 12, the voice recognition server 300 divides a text of an uttered voice received into meaning unit texts (S1210). The voice recognition server 300 determines an index value having the meaning unit texts divided from the text of the uttered voice as, for example, scalar or vector values (S1220).

For example, in response to receiving a text of a user's uttered voice, the voice recognition server 300 divides the received text into meaning unit texts. A meaning unit or meaning unit text may, for example, refer to a unit from a sentence corresponding to a text that has a meaning, and such a unit that has a meaning may be of one of various formats such as a word, phrase, sentence and paragraph.

When a meaning unit text is divided from a text of a user's uttered voice, the voice recognition server 300 determines an index value having the divided meaning unit texts as, for example, scalar or vector values. An index value may, for example, refer to a value that is located at one point within a continuous space. In an example embodiment, an index value may be determined using, for example, a Skip-Gram method.

Figure 13:
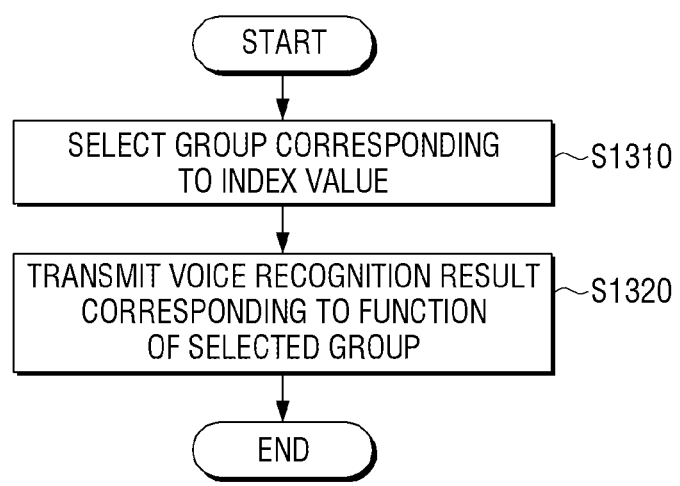
FIG. 13 is a flowchart illustrating an example method for performing a function corresponding to an uttered voice in a voice recognition server.

FIG. 13 is a flowchart illustrating an example method for performing a function corresponding to an uttered voice in a voice recognition server.

As illustrated in FIG. 13, when an index value of a meaning unit text divided from a text of the user's uttered voice is determined, the voice recognition server 300 selects a group corresponding to the determined index value, and transmits a voice recognition result corresponding to the function of the selected group to the user terminal apparatus 100 (S1310, S1320).

For example, in response to the function of the selected group being a command processing function, the voice recognition server 300 transmits a control command for controlling an operation of the user terminal apparatus 100 to the user terminal apparatus 100. In response to the function of the selected group being an intention processing function or a sentiment processing function, the voice recognition server 300 transmits at least one of a response message, control command and search result of the user's uttered voice to the user terminal apparatus 100.

For example, the voice recognition server 300 determines an index value of a text of the user's uttered voice based on the index value determined from the meaning unit text divided from the text of the user's uttered voice.

In an example embodiment, the voice recognition server 300 may determine an index value of the text of the user's uttered voice from a sum of the index values determined from the meaning unit texts divided from the text of the user's uttered voice. In response to the index value of the text of the user's uttered voice being determined, the voice recognition server 300 compares the index value tagged to each of the pre-stored plurality of groups and the index value of the text of the user's uttered voice, and selects a group of which the difference between its index value and the index value of the text of the user's uttered voice is, for example, the smallest.

The voice recognition server 300 generates a voice recognition result in response to the user's uttered voice based on the function set to the selected group, and transmits the generated voice recognition result to the user terminal apparatus 100.

The user terminal apparatus 100 may perform an operation corresponding to the user's uttered voice based on the voice recognition result received from the voice recognition server 300.

Explanation has been made with a focus on the example embodiments of the disclosure.

The voice recognition sever and control method according to various example embodiments described above may be implemented in a program to be provided to the display apparatus. For example, the program including the portable terminal apparatus and control method may be stored and provided in a non-transitory computer readable medium.

The non-transitory computer readable medium may refer to a machine-readable medium semi-permanently storing the data. For example, various applications or programs described above may be stored and provided in the non-transitory computer readable medium such as a compact disc (CD), a digital versatile disk (DVD), a hard disk, a Blu-ray disk, a universal serial bus (USB), a memory card, a read-only memory (ROM), or the like.

The foregoing example embodiments and advantages are merely examples and are not to be construed as limiting the disclosure. The disclosure can be readily applied to other types of apparatuses. Also, the description of the example embodiments of the disclosure is intended to be illustrative, and not to limit the scope of the claims, and many alternatives, modifications, and variations will be apparent to those skilled in the art.

What is claimed is:

1. A method for controlling a voice recognition server, the method comprising:
identifying an index value which is a value that is located at one point within a continuous space for each of a plurality of training texts by a processor;
setting a group for each of the plurality of training texts based on a similarity of the index value and a distance between the index value and locations of a predefined plurality of groups by the processor, and wherein the setting the group comprises setting an average value of the different index values included in the group as the index value of the group;
matching a function corresponding to each group by a processor;
storing the matched results;
identifying an index value from a received uttered voice in response to receiving a user's uttered voice from a user terminal apparatus by a processor;
searching for a group corresponding to the index value identified from the received uttered voice by comparing the index value of the group with index value identified from the received uttered voice by a processor; and
performing the function corresponding to the uttered voice based on the group corresponding to the index value by a processor.

2. The method according to claim 1, wherein the identifying an index value for each training text comprises: dividing the training text into meaning units; identifying the index value having the meaning units as scalar or vector values; and tagging the identified index value to each of the meaning units.

3. The method according to claim 2, wherein the index value is to be identified using a Skip-Gram method.

4. The method according to claim 2, further comprising:
setting a function corresponding to the set group;
tagging the function to the group; and
storing the tagged result.

5. The method according to claim 4,
wherein the setting a group further includes setting an index value closest to the average value as the index value of the group.

6. The method according to claim 5,
wherein the setting a function includes setting at least one of: a command processing function, an intention processing function and a sentiment processing function as the function corresponding to the group, based on a received command.

7. The method according to claim 6,
wherein the identifying an index value from the received uttered voice comprises: dividing a text recognized from the uttered voice into meaning units; and identifying the index value by expressing the meaning units divided from the text as scalar or vector values.

8. The method according to claim 7,
wherein the performing the function comprises: selecting a group that corresponds to the identified index value among the pre-stored groups; and transmitting a voice recognition result corresponding to the function of the selected group to the user terminal apparatus.

9. The method according to claim 8,
wherein the transmitting a voice recognition result includes, in response to the function of the selected group being the command processing function, transmitting a control command for controlling an operation of the user terminal apparatus to the user terminal apparatus, and
in response to the function of the selected group being the intention processing function or the sentiment processing function, transmitting at least one of: a response message, control message, and search result of the uttered voice, to the user terminal apparatus.

10. A voice recognition server comprising:
memory;
a processor configured to:
identify an index value, which is a value that is located at one point within a continuous space, of each of a plurality of training texts,
set a group for each of the plurality of training texts based on a similarity of the index value and a distance between the index value and locations of a predefined plurality of groups, and wherein the set the group comprises the processor configured to set an average value of the different index values included in the group as the index value of the group;
match a function corresponding to each group,
control to memory to store the matched results,
in response to receiving a user's uttered voice from a user terminal apparatus, identify an index value from the received uttered voice, and
search a group corresponding to the index value identified from the received uttered voice by comparing the index value of the group with index value identified from the received uttered voice, and to perform the function corresponding to the uttered voice.

11. The voice recognition server according to claim 10,
wherein the processor is further configured to:
divide the training text into meaning units;
identify the index value having the meaning units divided by the first text divider as scalar or vector values; and
tag the index value identified by the first meaning index part to each of the meaning units.

12. The voice recognition server according to claim 11,
wherein the index value is to be identified using a Skip-Gram method.

13. The voice recognition server according to claim 11,
wherein the processor is further configured to:
set a function corresponding to the set group, and to tag the function to the group and store the tagged result.

14. The voice recognition server according to claim 13,
wherein the group setting processing circuitry further comprises group index processing circuitry configured to set an index value closest to the average value as the index value of the group.

15. The voice recognition server according to claim 14,
wherein the processor is configured to set at least one of: a command processing function, an intention processing function and a sentiment processing function, as the function corresponding to the group, based on a received command.

16. The voice recognition server according to claim 15,
wherein the processor is further configured to:
divide a text recognized from the uttered voice into meaning units; and
identify the index value by expressing the meaning units divided from the text as scalar or vector values.

17. The voice recognition server according to claim 16, wherein the processor is configured to select a group corresponding to the identified index value among the pre-stored groups; and to transmit a voice recognition result corresponding to the function of the selected group to the user terminal apparatus.

18. The voice recognition server according to claim 17, wherein the processor, in response to the function of the selected group being the command processing function, is configured to transmit a control command for controlling an operation of the user terminal apparatus to the user terminal apparatus, and in response to the function of the selected group being the intention processing function or the sentiment processing function, is configure to transmit at least one of: a response message, a control message, and a search result of the uttered voice to the user terminal apparatus.

\* \* \* \* \*